(No Model.) 5 Sheets—Sheet 1.
A. J. KLETZKER & B. DUBINSKI.
CASH INDICATOR AND REGISTER.
No. 420,346. Patented Jan. 28, 1890.
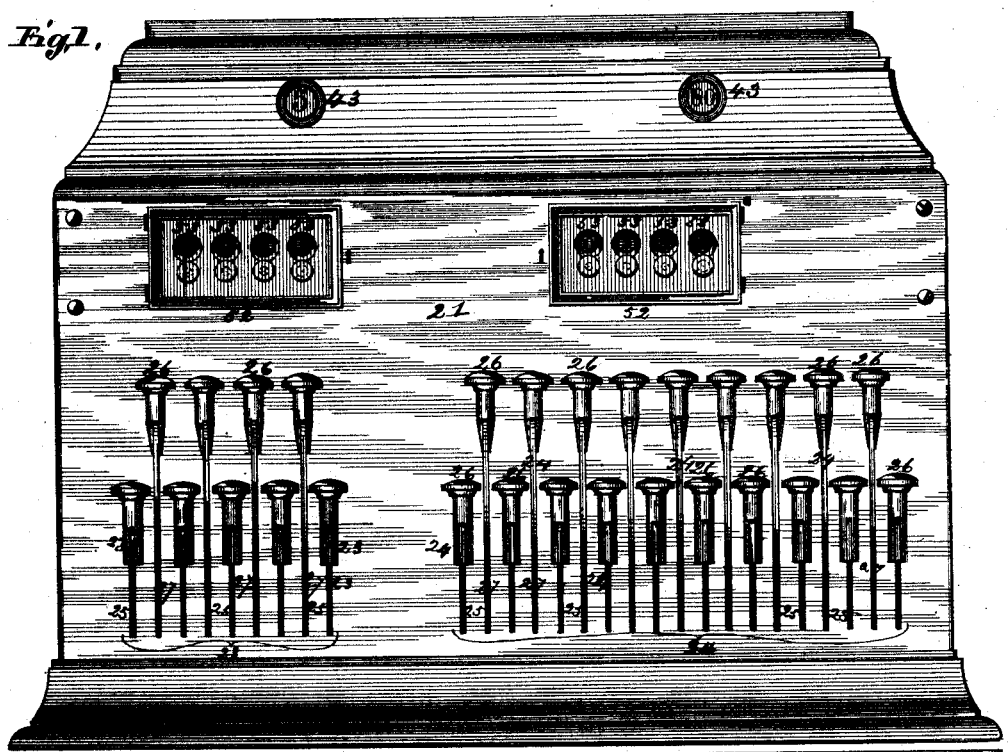
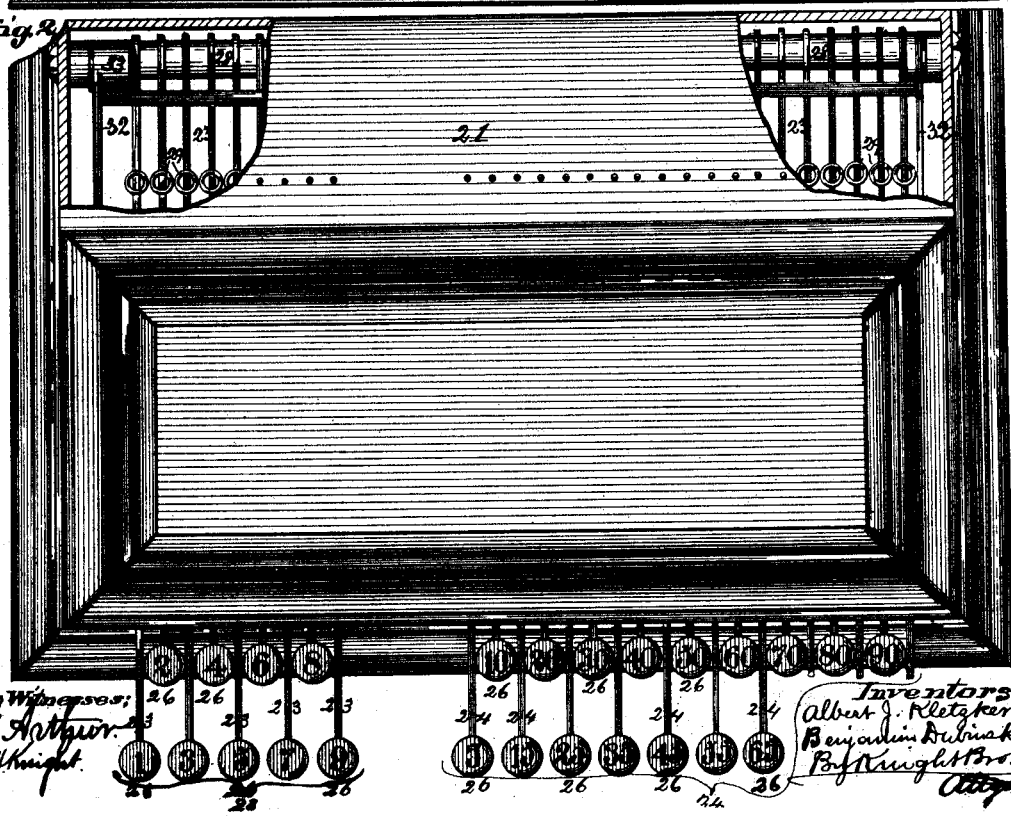

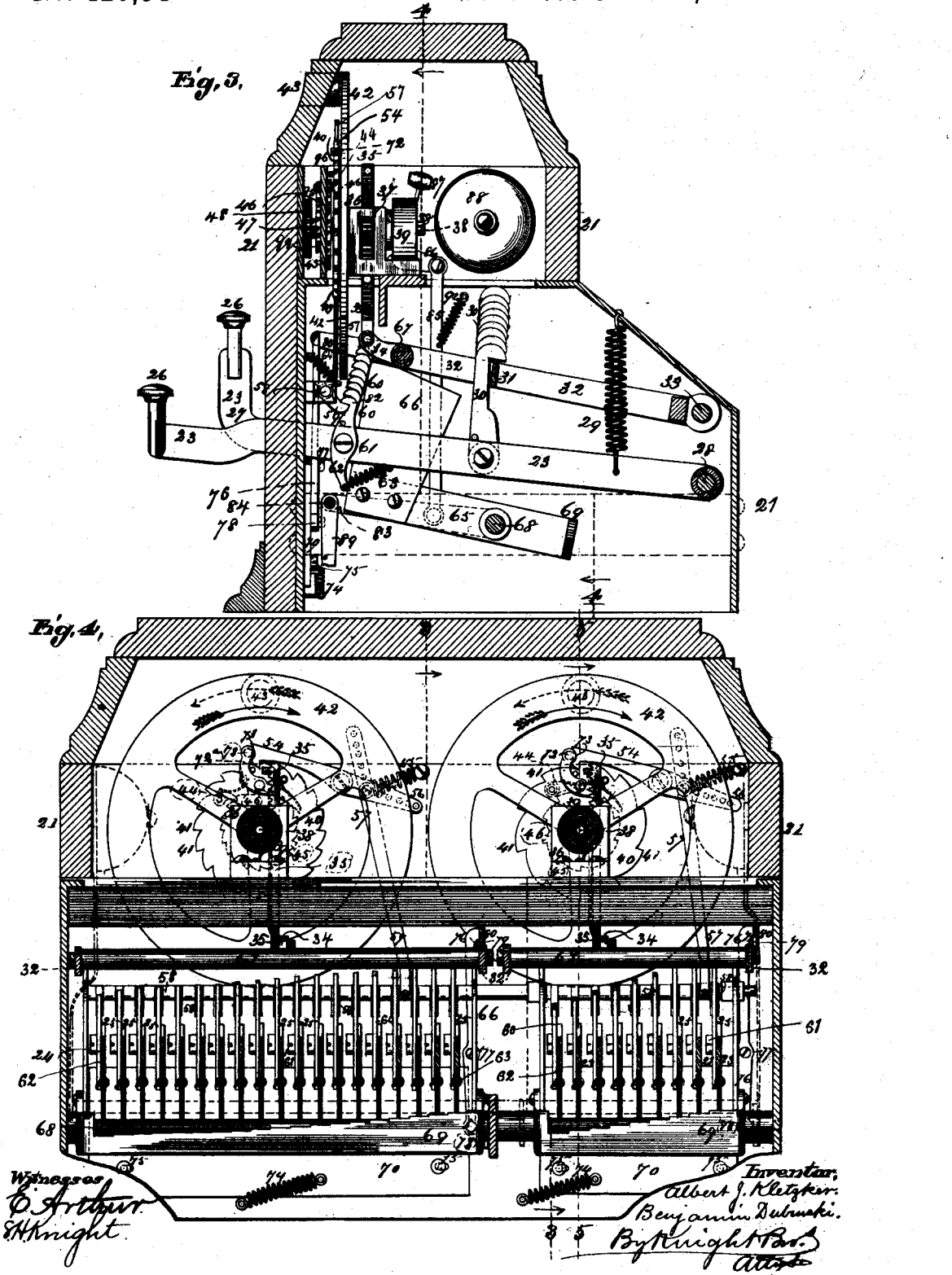

(No Model.) 5 Sheets—Sheet 3.
A. J. KLETZKER & B. DUBINSKI.
CASH INDICATOR AND REGISTER.
No. 420,346. Patented Jan. 28, 1890.
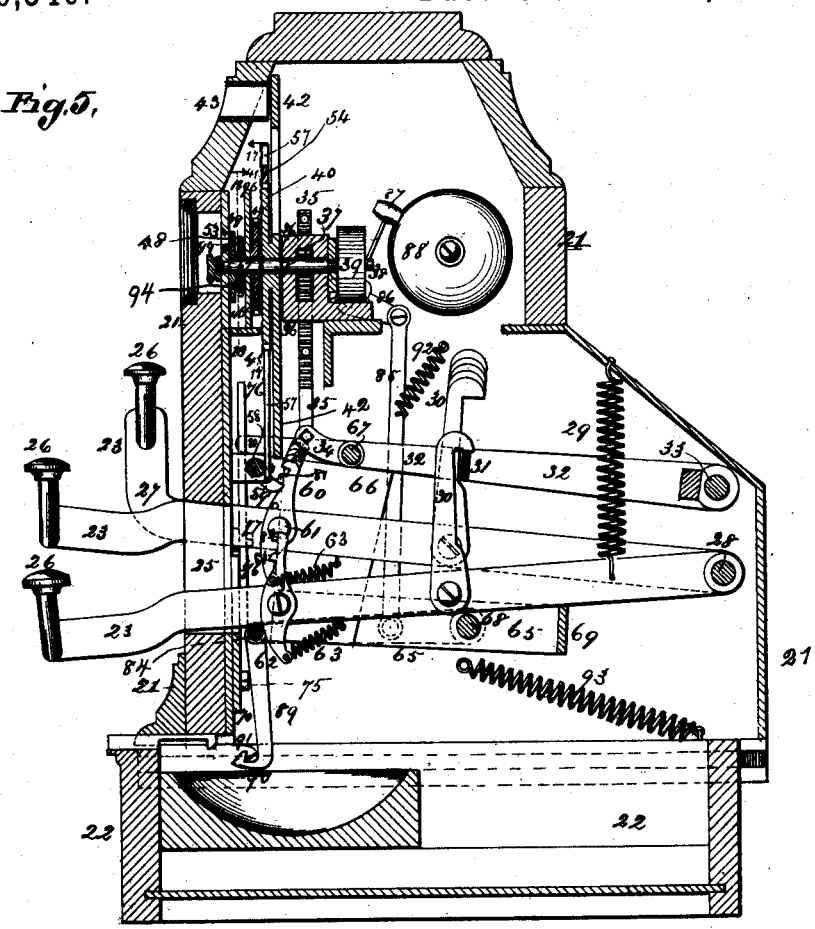
Witnesses:
E. Arthur
S. H. Knight
Inventors:
Albert J. Kletzker
Benjamin Dubinski
By Knight Bro.
Attys.

(No Model.) 5 Sheets—Sheet 4.

A. J. KLETZKER & B. DUBINSKI.
CASH INDICATOR AND REGISTER.

No. 420,346. Patented Jan. 28, 1890.

Witnesses:
C. Arthur
S. H. Knight

Inventors:
Albert J. Kletzker.
Benjamin Dubinski.
By Knight Bro.
Attys

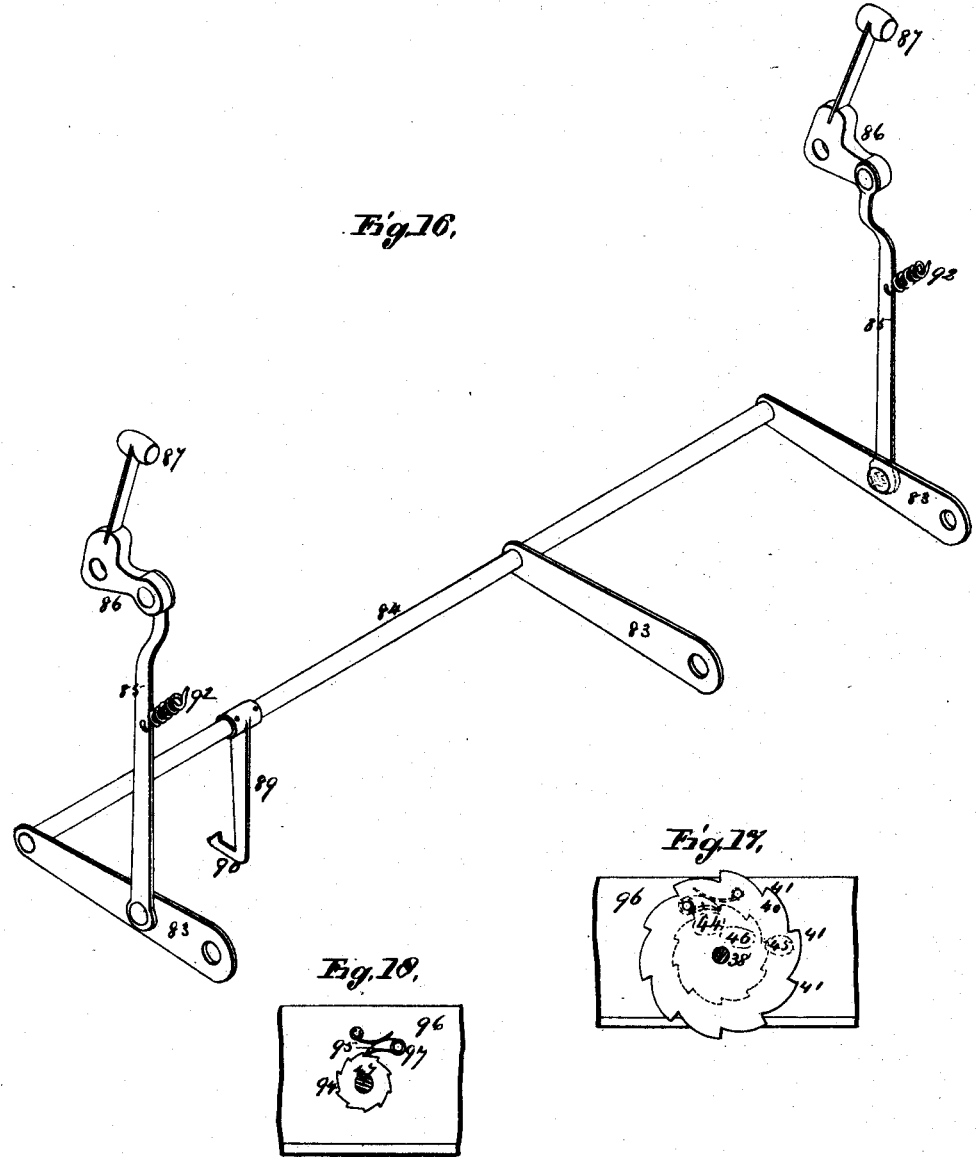

UNITED STATES PATENT OFFICE.

ALBERT J. KLETZKER AND BENJAMIN DUBINSKI, OF ST. LOUIS, MISSOURI; SAID DUBINSKI ASSIGNOR TO SAID KLETZKER.

CASH INDICATOR AND REGISTER.

SPECIFICATION forming part of Letters Patent No. 420,346, dated January 28, 1890.

Application filed May 16, 1889. Serial No. 310,999. (No model.)

*To all whom it may concern:*

Be it known that we, ALBERT J. KLETZKER and BENJAMIN DUBINSKI, both of the city of St. Louis, in the State of Missouri, have invented a certain new and useful Improvement in Cash Registers and Indicators, of which the following is a full, clear, and exact description, reference being had to the accompanying drawings, forming part of this specification.

This is a device for registering and indicating the amount of cash received.

Figure 7:
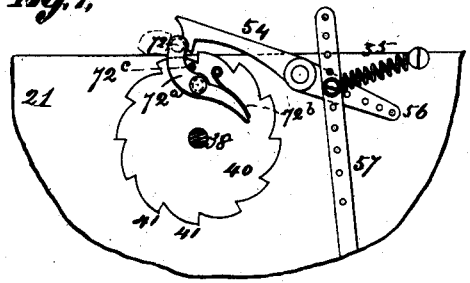
Figure 8:
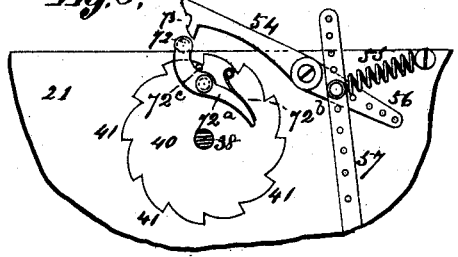
Figure 9:
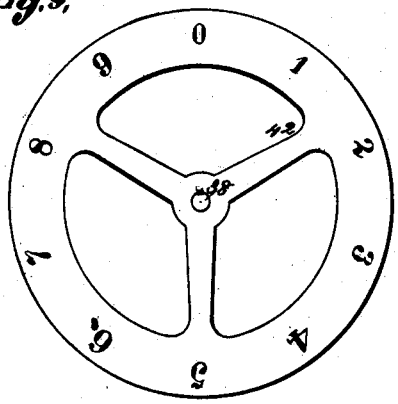
Figure 10:
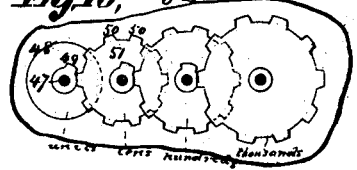
Figure 11:
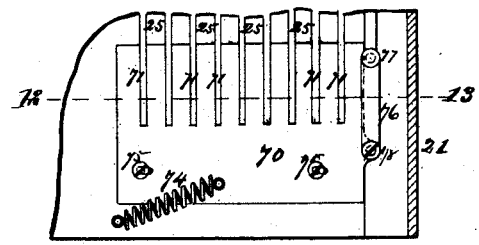
Figure 14:
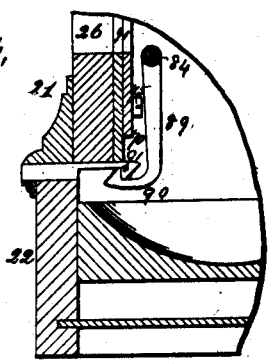
Figure 12:
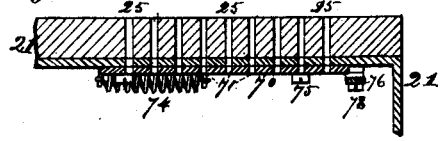
Figure 13:
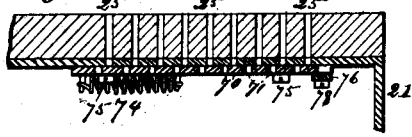
Figure 15:
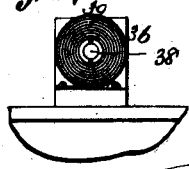

Figure 1 is a front elevation of our improved machine. Fig. 2 is a top view with part broken out. Fig. 3 is a vertical transverse section at 3 3, Fig. 4. Fig. 4 is a vertical longitudinal section at 4 4, Fig. 3. Fig. 5 is a vertical transverse section at 5 5, Fig. 4. Fig. 6 is a detail transverse section illustrating movement of parts. Fig. 7 is a detail view showing the position of parts when the large register-wheel has just returned to its normal position after the dog has been raised to its intermediate position to allow the return. Fig. 8 is a similar view showing the dog raised to its highest position to allow the large register-wheel to be turned forward. Fig. 9 is a front view of the larger or large register-wheel. Fig. 10 is a detail elevation of the register-wheels. Fig. 11 is a detail rear elevation of the lever-lock. Fig. 12 is a horizontal section at 12 13, Fig. 11, showing lock open. Fig. 13 is a similar section showing the lock closed. Fig. 14 is a detail transverse section at 5 5, Fig. 4, showing the drawer locked. Fig. 15 is a detail showing side view of the return-spring of the large register-wheel. Fig. 16 is a detail perspective view of the bell and lock-frame. Fig. 17 is a detail section at 17 17, Fig. 5. Fig. 18 is a detail section at 18 18, Fig. 5.

The machine has two parts similar in principle, one of which is for the registration and indication of dollars and the other of cents, in fives.

The case 21 may be of any desired or suitable form, having in its lower part a cash-drawer 22.

At 23 and 24 are shown sets of keys, the keys 23 being intended to register dollars and the keys 24 cents. The keys pass through vertical slots 25 in the case. They carry thumb-knobs 26, arranged in two courses for convenience of manipulation, the shanks of the upper course being bent upward at 27, and their knobs 26 being nearer to the front wall of the case than those of the lower keys. The keys are fulcrumed on a rod or bar 28, extending from end to end of the machine. Each key is sustained in its upper position by a separate spring 29, extending from the key to the top of the case. (See Figs. 3 and 5.) The construction of the keys is similar, except as far as relates to the upward bending of the shanks and hooks upon them by which register-wheels are actuated.

30 represents hooks graduated in length. Each key has a hook 30 engaging on the longitudinal bar 31 of a frame, whose end bars 32 are pivoted at 33 to the frame. The frames 31 32 have at their fore part a longitudinal bar 67, formed with a projection 34, hinged to the lower end of a rack-bar 35, which slides vertically in housing 36. The rack-bar 35 engages a spur-wheel 37 on a shaft 38, so that when either key is depressed the shaft 38 is turned forward.

39 is a coiled spring tending to turn the shaft 38 backward and restore the frame 31 32 to its upper position, one end of the spring being attached to the shaft, and the other end to a fixed point. (See Fig. 15.)

40 is a ratchet-wheel fast upon the shaft 38, and having upon the dollar-register ten teeth 41, one for zero (0) and one for each of the numerals 1 to 9, inclusive, the said figures being upon the side of the rim of the large indicator-wheel 42, which is also fast upon the shaft 38. On the cent side the large indicator-wheel 42 has figures 0 and 5 to 95, inclusive, in steps of five—namely, twenty in all. There is in each case a key for each of the numbers except the "0," each indicator-wheel and its ratchet-wheel flying back to 0 previous to each act of indication and registration, and the key in each case being constructed to pull down the frame and its rack-bar a sufficient distance to cause the spur-wheel to turn the large indicator-wheel a sufficient distance to bring the same number upon the wheel to that upon the key to an orifice 43 in the front wall of the case, through which the numbers upon the indicator-wheel 42 may be seen. The normal position of the indicator-wheel 42 is such that the zero-mark (0) is seen through the hole 43. As the shaft 38 is rotated by the downward movement of the frame 31 32, the number "1" is first brought in front of the hole 43, and then the number "2," and so on until the number is reached indicating the number of dollars paid in, (from one to nine.) The ratchet-wheel 40 carries a spring-pawl 44, which engages the teeth 45 of a ratchet-wheel 46, fast upon a shaft 47, which is in line with the shaft 38, but disconnected from it.

Fast upon the shaft 47 is the units register-wheel 48, numbered, as usual, from 0 to 9, and 49 is a tooth upon the hub of the wheel 48, Fig. 10, which engages the ten teeth 50 of the second register-wheel 51, which registers the tens, as usual. Each rotation of the units-wheel causes one-tenth of a rotation of the wheel 51.

No novelty is claimed in the register 52 *per se*, nor is it necessary to describe the same more than to say that it may consist of a units, tens, hundreds, and thousands wheel, as shown, driven by usual or suitable mechanism.

53 are the holes through which the proper numbers on the register-wheels are exposed.

The hooks 30 are graduated, as already stated, in length, so that the depression of a key will cause the indicator-wheel to turn sufficiently to indicate and register the amount corresponding to the key depressed. Supposing the key marked 9 in Fig. 2 be depressed, the indicator-wheel 42 is turned, by the means already stated, from 0 to 9, the latter number showing through the hole 43. At the same time the units-wheel 48 is turned by the pawl 44 engaging the ratchet-wheel 46 on the independent shaft 47 to bring the number "9" before the hole 53. The large indicator-wheel is held in this position by a spring-dog 54, which engages the ratchet-teeth 41 and prevents the spring 39 turning the wheel 42 backward to its normal position.

55 is a draw-spring connecting the extension 56 of the dog to a fixed point above it, and which acts to hold the dog in engagement with the ratchet-teeth 41.

57 is a link which is adjustably hinged to the extension 56 and hinged at the lower end to the rear side of a rock-shaft 58. The rock-shaft has projecting from its rear side a number of teeth 59—one for each of the register-keys of the set—said teeth being engaged by hooks 60, one of which is pivoted to each key at 61. The hooks have downward extensions 62, connected with the key-shanks by springs 63, whose purpose is to hold the hooks in position to engage the teeth 59. The construction is such that in the normal position of parts the top of the hook 60 is above the tooth 59, so that when the key is depressed the rock-shaft is turned and the dog 54 lifted from the tooth 41, allowing the large indicator-wheel 42 to fly back to its normal position under the influence of the spring 39. The units register-wheel 48, however, does not turn back as the pawl 44 runs backward over the ratchet-wheel 46 without said register-wheel.

64 is a draw-spring connecting the rear side of the rock-shaft 58 with the case above the rock-shaft and whose office is to turn the rock-shaft and raise the teeth 59 to their normal position. The spring 55 may, however, be made strong enough to perform its own part upon the dog 54, and also to turn the rock-shaft to its normal position.

65 is a tilting frame beneath the keys, having an upwardly-extending plate 66, which is held in contact with the longitudinal bar 67, extending from one to the other of the end bars 32 of the frame 31 32, so that when the front part of the frame is drawn down by the keys it tilts down the front part of the frame 65 on its pivot-bar 68 and throws up the longitudinal rear bar 69 until it comes in contact with the bottom of the key, and thus limits the descent of the key.

70 is a sliding locking-plate, which has a number of open-topped slots 71, which, when the plate is in the position shown in Figs. 11 and 12, exactly coincide with the slots 25, in which the key-shanks play. When the keys are in their normal position, the key-shanks are above the top of the lock-plate, so that when the plate is moved into the position shown in Fig. 13 the keys can be only depressed a little distance—that is, until they impinge against the top edge of the lock-plate. The distance is far enough, however, to disengage the dog 54 from the ratchet-wheel 40 and allow the wheel to rotate back to its normal position, ready to be again turned forward to indicate and register the required number.

Between the ratchet-wheel and the indicator-wheel is a dog $72^a$, held in normal position by a spring $72^b$, causing it to bear against a stud $72^c$. This dog has a stud 72, (which preferably carries a rubber or other roller,) which, as the ratchet-wheel 40 attains its normal position, impinges against the dog 54 and prevents the momentum of the wheel carrying it backward beyond that point. The dog 54 is shown with a recess 73 to receive the stud 72.

74 is a spring tending to draw the locking-plate into the position shown in Figs. 11 and 12, the plate working on screws or studs 75, which pass through longitudinal slots in the plate.

76 is a lever fulcrumed to the frame at 77 and pivoted to the locking-frame 70 at 78, so that the oscillatory movement of the lever causes the endwise reciprocation of the plate. The upper end of the lever has an incline 79, against which acts a projection or finger 80 of one of the side bars 32 as the side bar ascends and pushes the upper end of the lever over, so as to move the locking-plate into the position shown in Fig. 13. This position of these parts is shown in Fig. 3, while the other position is shown in Fig. 5.

The keys all start from the same position, as far as concerns that part of the shank to which the actuating-hooks 30 and 60 are connected, and all have the same movement, being depressed to the same level, while the movements of the frame 31 32, rack-bar 35, and indicator and register wheels are proportional to the numbers upon the keys. In order to do this the shanks of the hooks 30 and 60 are made to vary in length, so that the keys having the smaller numbers move near to the lowest points before the hooks 30 engage the bar 11 or the hooks 60 engage the teeth 59. Thus when the key marked 1 has moved eight-ninths its hook commences to act on the bar 31 and the frame is drawn down in the balance of the movement sufficiently to turn the indicator-wheel 42 one space and the figure "1" is brought to the hole 43. The same rule applies to the other keys. For instance, the key marked 2 goes through seven-ninths of its movement before it acts on the frame 31 32, while the key marked 9 acts on the frame at the beginning of its stroke. Now as all of the keys, by means of the hooks 60, act on the teeth 59 at the beginning of the downstroke, it is evident that all the hooks 60, except that upon the key marked 9, (or "9-key,") must have an additional hook projection, which in the normal position of the key is just above the tooth 59. This additional hook or projection is marked 81. The projections 81 upon all the keys marked 1 to 8, inclusive, are the same height when the keys are in elevated position as the single projection 82 upon the key marked 9. The projections 81 and 82 are inclined or curved at top, so that as the keys ascend the hook-bars 60 are pushed backward at the upper end by the inclined or curved under side of the teeth 59, and so the projections slip past the said teeth into a position to act on the teeth at the next downward movement of a key.

83 (see Figs. 3 and 16) are arms pivoted on the bar 68 and carrying at their free ends a longitudinal bar 84, extending nearly the whole length of the machine, so that when any key is depressed the latter comes in contact with or strikes the longitudinal bar, which is forced downward, being swung by its arms on the bar or rod 68.

85 are connecting-rods extending from two of the arms 83 to bell-cranks 86, carrying hammers 87, adapted to strike bells 88 at each descent of the arms 83, so that a bell is sounded on the descent of each key a certain distance.

89 is a hanging hook, whose end 90 is adapted to engage a hook 91 upon the drawer and so lock it in a closed position. (See Fig. 14.)

92 are springs whose office it is to draw and hold up the frame composed of the arms 83 and bar 84 in the normal position when not depressed by a key. When the frame 83 84 is pushed down, it disengages the hook 89 from the drawer-hook 91 and allows the drawer to open, which it does under the influence of a spring 93. (See Fig. 5.) When the drawer is pushed shut, the hooks 89 91 slip past each other and engage on the drawer, reaching its inner position.

In order to prevent the retrograde motion of the register-shaft 47 when the wheel 40 is turning back to its normal position, we secure upon the shaft 47 a ratchet-wheel 94, whose teeth are engaged by a spring-pawl 95, pivoted to the housing 96 at 97. (See Fig. 18.)

The description in the main has applied to the portion of the machine by which the dollars are registered. Exactly the same principle of construction is present in the portion by which the cents are registered, while some of the parts hereinbefore described apply to or are common to both—for instance, the drawer-locking and bell-ringing devices.

The operation is as follows: Suppose the parts to be in the position they are left after indicating and registering an amount, as seen in Figs. 1, 2, 3, and 4. The large indicator-wheels show at 43 the last amounts received in dollars and cents, respectively, and the registers 52 show the aggregate receipts in dollars and cents, respectively. As seen in Fig. 1, the registers indicate that two hundred and one dollars and thirty-three dollars and fifteen cents have been received. Now suppose the key marked 8 is pushed downward. The projection 81 engages the tooth 59 and turns the shaft 58 a certain distance. This lifts the dog 54 to the position shown in Fig. 7 and releases the wheel 40. The large indicator-wheel turns back to normal position. The locking-plate 70 is at this time held in the locking position by the spring 74, so that the key is arrested by the top of the lock-plate. The stud 72 strikes the head of the dog 54 and arrests the backward rotation of the wheels 40 and 42. As these wheels turn backward, the free edge of the frame 31 32 rises and the projection 80 thereon acts against the incline 70 of the lever 76 and moves the locking-plate 70 into the position shown in Figs. 11 and 12, so that the key may descend to its lowest position, carrying down with it the frame 31 32 and turning the large indicator-wheel until number "8" is brought to the hole 43. The spring 29 lifts the key as soon as released, and as it passes the top of the locking-plate the latter is drawn by the spring into the locking position. The frame 31 32, however, remains in its lower position, being held there by the action of the dog 54 upon the wheel 40. The purpose of the locking-plate is to give the large indicator-wheel time to return to its normal position before the descent of the key again turns it forward.

We claim as our invention—

1. The combination of a number of keys, means for sustaining the keys in normal position, a frame having two longitudinal bars and pivoted at its inner end, connections graduated in length and coupling the keys with one of the longitudinal bars of the frame, a shaft having an indicator-wheel and spur-wheel fixed thereto so as to turn therewith, means for returning the shaft to normal position, and a rack-bar connected with the other longitudinal bar of the frame and having its teeth meshing with the spur-wheel, substantially as described.

2. The combination of a number of keys, a frame having two longitudinal bars and pivoted at its inner end, graduated hooks connecting the keys with a longitudinal bar of the frame, a shaft having an indicator-wheel, spur-wheel, and ratchet-wheel fixed thereto, a rack-bar connected with the other longitudinal bar of the frame and having its teeth meshing with the spur-wheel, a short shaft having a ratchet-wheel fixed thereto, a spring-pawl on the first-named ratchet-wheel engaging the last-named ratchet-wheel, and the register connected with the short shaft, substantially as described.

3. The combination of the key-levers 23, having hooks 30, the frame 31 32, having the rack-bar 35, the shaft 38, the spur-wheel 37, indicator-wheel 42 and ratchet-wheel 40 on said shaft, the dog 54, the dog 72ª, having stud 72, the ratchet-wheel 46, the pawl 44, and the register, substantially as and for the purpose set forth.

4. The combination of the key-levers 23, having hooks 30, the frame 31 32, having the rack-bar 35, the shaft 38, the spur-wheel 37, indicator-wheel 42 and ratchet-wheel 40 on said shaft, the dog 54, the ratchet-wheel 46, the pawl 44, and the register, substantially as and for the purpose set forth.

5. The combination of the dog 54, the rock-shaft 58, the rod 57, connecting the shaft with the dog, the teeth 59 on the rock-shaft, and the key-levers having hooks 60, substantially as and for the purpose set forth.

6. The combination of the rock-shaft 58 with teeth 59, rod 57, dog 54, ratchet-wheel 40, shaft 38, spring 39, key-levers 23, and hooks 60, engaging the teeth 59, substantially as and for the purpose set forth.

7. The combination of the rock-shaft 58 with teeth 59, the dog 54, rod 57, and key-levers 23, carrying hooks 60, having projections 81 and 82, substantially as and for the purpose set forth.

8. The combination, in a cash-register, of key-levers 23 with hooks 30, varying in length, the frame 31 32, rack-bar 35, shaft 38, spur-wheel 37, indicator-wheel 42, and spring 39, all substantially as set forth.

9. The combination, with the ratchet-wheel 40, of the dog 54 and the dog 72ª, having a projection 72, substantially as and for the purpose set forth.

10. The combination of the wall or plate 21, having slots 25, the key-levers 23, the lock-plate 70, having slots 71, the spring 74, the frame 31 32, having the projection 80, the hooks 30, and the lever 76, having incline 79 to receive the pressure of the projection 80, all substantially as and for the purpose set forth.

11. The combination of the key-levers 23, the hooks 30, the frame 31 32, with bar 67, and tilting frame 65, having upward projection 66 and bar 69, all substantially as and for the purpose set forth.

12. The frame 83 84, with pendent hook 89, engaging the drawer 22, in combination with the key-levers 23, substantially as and for the purpose set forth.

ALBERT J. KLETZKER.
BENJ. DUBINSKI.

In presence of—
  EDW. S. KNIGHT,
  THOMAS KNIGHT.